(12) United States Patent
Hikem et al.

(10) Patent No.: US 11,162,018 B2
(45) Date of Patent: Nov. 2, 2021

(54) MICROEMULSION FLOWBACK RECOVERY COMPOSITIONS AND METHODS FOR MAKING AND USING SAME

(71) Applicant: PfP TECHNOLOGY, LLC, Houston, TX (US)

(72) Inventors: Aziz Hikem, Houston, TX (US); Derek Vaughn, Houston, TX (US)

(73) Assignee: PfP Industries, LLC, Houston, TX (US)

( * ) Notice: Subject to any disclaimer, the term of this patent is extended or adjusted under 35 U.S.C. 154(b) by 0 days.

(21) Appl. No.: 16/698,608

(22) Filed: Nov. 27, 2019

(65) Prior Publication Data

US 2020/0239763 A1 Jul. 30, 2020

Related U.S. Application Data

(62) Division of application No. 15/478,455, filed on Apr. 4, 2017, now Pat. No. 10,494,564.

(60) Provisional application No. 62/447,007, filed on Jan. 17, 2017, provisional application No. 62/495,590, filed on Apr. 4, 2016.

(51) Int. Cl.
  *C09K 8/60* (2006.01)
  *C09K 8/04* (2006.01)

(52) U.S. Cl.
  CPC ............... *C09K 8/602* (2013.01); *C09K 8/04* (2013.01)

(58) Field of Classification Search
  CPC .. C09K 2208/08; C09K 8/52; C09K 2208/30; C09K 8/035; C09K 8/04; C09K 8/508; C09K 8/516; C09K 8/524; C09K 8/68; C09K 8/725; C09K 8/74; C09K 8/86; C09K 8/602; C09K 8/60
  See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Wailes et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |

(Continued)

OTHER PUBLICATIONS

U.S. Appl. No. 12/075,461, filed Mar. 11, 2008, Gatlin et al.

*Primary Examiner* — Kumar R Bhushan
(74) *Attorney, Agent, or Firm* — Robert W. Strozier

(57) ABSTRACT

A microemulsion well stimulation compositions for flowback water recovery includes an aqueous system, a surfactant system, a solvent system, and optionally a winterizing system, where the solvent system includes a dibasic ester or a plurality of dibasic esters and the composition is non-flammable, non-combustible, non-hazardous, and/or environmentally friendly, while demonstrating comparable or superior flowback recovery performance compared to known water recovery formulations that utilize more flammable components.

21 Claims, 4 Drawing Sheets

(56) References Cited

U.S. PATENT DOCUMENTS

| | | | | |
|---|---|---|---|---|
| 5,024,276 | A | 6/1991 | Borchardt | 166/308.6 |
| 5,067,556 | A | 11/1991 | Fudono et al. | 62/196.4 |
| 5,074,359 | A | 12/1991 | Schmidt | 166/280.1 |
| 5,074,991 | A | 12/1991 | Weers | 208/236 |
| 5,082,579 | A | 1/1992 | Dawson | 507/211 |
| 5,106,518 | A | 4/1992 | Cooney et al. | 507/21 |
| 5,110,486 | A | 5/1992 | Manalastas et al. | 507/260 |
| 5,169,411 | A | 12/1992 | Weers | 44/421 |
| 5,224,546 | A | 7/1993 | Smith et al. | 166/300 |
| 5,228,510 | A | 7/1993 | Jennings, Jr. et al. | 166/263 |
| 5,246,073 | A | 9/1993 | Sandiford et al. | 166/295 |
| 5,259,455 | A | 11/1993 | Nimerick et al. | 166/308.5 |
| 5,330,005 | A | 7/1994 | Card et al. | 166/280.2 |
| 5,342,530 | A | 8/1994 | Aften et al. | 252/8.551 |
| 5,347,004 | A | 9/1994 | Rivers et al. | 544/180 |
| 5,363,919 | A | 11/1994 | Jennings, Jr. | 166/308.1 |
| 5,465,792 | A | 1/1995 | Dawson et al. | 166/300 |
| 5,402,846 | A | 4/1995 | Jennings, Jr. et al. | 166/259 |
| 5,411,091 | A | 5/1995 | Jennings, Jr. | 166/280.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,472,049 | A | 12/1995 | Chaffe et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,549,840 | A | 8/1996 | Mondin et al. | |
| 5,551,516 | A | 9/1996 | Norman et al. | 166/308.2 |
| 5,593,958 | A | 1/1997 | Mondin et al. | |
| 5,599,785 | A | 2/1997 | Mondin et al. | |
| 5,610,130 | A | 3/1997 | Barbara et al. | |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,716,925 | A | 2/1998 | Mondin et al. | |
| 5,722,490 | A | 3/1998 | Ebinger | 166/281 |
| 5,731,281 | A | 3/1998 | Mondin et al. | |
| 5,741,760 | A | 4/1998 | Mondin et al. | |
| 5,744,024 | A | 4/1998 | Sullivan, III et al. | 208/236 |
| 5,755,286 | A | 5/1998 | Ebinger | 166/281 |
| 5,759,983 | A | 6/1998 | Mondin et al. | |
| 5,763,386 | A | 6/1998 | Mondin et al. | |
| 5,775,425 | A | 7/1998 | Weaver et al. | 166/276 |
| 5,776,880 | A | 7/1998 | Mondin et al. | |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,833,000 | A | 11/1998 | Weaver et al. | 166/276 |
| 5,853,048 | A | 12/1998 | Weaver et al. | 166/279 |
| 5,854,193 | A | 12/1998 | Mondin et al. | |
| 5,861,367 | A | 1/1999 | Blanvalet et al. | |
| 5,871,049 | A | 2/1999 | Weaver et al. | 166/276 |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,952,281 | A | 9/1999 | Mondin et al. | |
| 5,964,295 | A | 10/1999 | Brown et al. | 166/308.2 |
| 5,979,557 | A | 11/1999 | Card et al. | 166/300 |
| 5,980,845 | A | 11/1999 | Cherry | 423/229 |
| 5,985,814 | A | 11/1999 | Zocchi et al. | |
| 6,016,871 | A | 1/2000 | Burts, Jr. | 166/300 |
| 6,017,868 | A | 1/2000 | Mondin et al. | |
| 6,020,296 | A | 2/2000 | Mertens et al. | |
| 6,035,936 | A | 4/2000 | Whalen | 166/308.5 |
| 6,047,772 | A | 4/2000 | Weaver et al. | 166/276 |
| 6,054,417 | A | 4/2000 | Graham et al. | 507/238 |
| 6,059,034 | A | 5/2000 | Rickards et al. | 166/280.2 |
| 6,060,436 | A | 5/2000 | Synder et al. | 507/266 |
| 6,069,118 | A | 5/2000 | Hinkel et al. | 507/277 |
| 6,123,394 | A | 9/2000 | Jeffrey | 299/16 |
| 6,133,205 | A | 10/2000 | Jones | 507/276 |
| 6,147,034 | A | 11/2000 | Jones et al. | 507/238 |
| 6,162,449 | A | 12/2000 | Maier et al. | 424/401 |
| 6,162,766 | A | 12/2000 | Muir et al. | 507/267 |
| 6,169,058 | B1 | 1/2001 | Le et al. | 507/222 |
| 6,191,090 | B1 | 2/2001 | Mondin et al. | |
| 6,228,812 | B1 | 5/2001 | Dawson et al. | 507/221 |
| 6,247,543 | B1 | 6/2001 | Patel et al. | 175/64 |
| 6,267,938 | B1 | 7/2001 | Warrender et al. | 423/226 |
| 6,283,212 | B1 | 9/2001 | Hinkel et al. | 166/279 |
| 6,291,405 | B1 | 9/2001 | Lee et al. | 507/136 |
| 6,330,916 | B1 | 12/2001 | Rickards et al. | 166/280.2 |
| 6,725,931 | B2 | 4/2004 | Nguyen et al. | 166/280.2 |
| 6,756,345 | B2 | 6/2004 | Pakulski et al. | 507/246 |
| 6,793,018 | B2 | 9/2004 | Dawson et al. | 166/300 |
| 6,832,650 | B2 | 12/2004 | Nguyen et al. | 166/279 |
| 6,875,728 | B2 | 4/2005 | Gupta et al. | 507/240 |
| 7,140,433 | B2 | 11/2006 | Gatlin et al. | 166/250.01 |
| 7,268,100 | B2 | 9/2007 | Kippie et al. | 507/244 |
| 7,350,579 | B2 | 4/2008 | Gatlin et al. | 166/308.3 |
| 7,989,404 | B2 * | 8/2011 | Kakadjian | C09K 8/68 507/261 |
| 2002/0049256 | A1 | 4/2002 | Bergeron, Jr. | 514/674 |
| 2002/0165308 | A1 | 11/2002 | Kinniard et al. | 524/492 |
| 2003/0220204 | A1 | 11/2003 | Baran, Jr. et al. | 507/200 |
| 2005/0045330 | A1 | 3/2005 | Nguyen et al. | 166/281 |
| 2005/0092489 | A1 | 5/2005 | Welton et al. | 166/280.2 |
| 2005/0137114 | A1 | 6/2005 | Gatlin et al. | 510/424 |
| 2005/0153846 | A1 | 7/2005 | Gatlin | 208/236 |
| 2005/0250666 | A1 | 11/2005 | Gatlin et al. | 510/492 |
| 2006/0194700 | A1 | 8/2006 | Gatlin et al. | 507/203 |
| 2007/0032693 | A1 | 2/2007 | Gatlin et al. | 507/239 |
| 2007/0093404 | A1 * | 4/2007 | Gross | C11D 3/2093 510/407 |
| 2007/0129257 | A1 | 6/2007 | Kippie et al. | 507/102 |
| 2007/0131425 | A1 | 6/2007 | Gatlin et al. | 166/280.2 |
| 2007/0173413 | A1 | 7/2007 | Lukocs et al. | 507/238 |
| 2007/0173414 | A1 | 7/2007 | Wilson, Jr. | 507/131 |
| 2008/0039345 | A1 | 2/2008 | Kippie et al. | 507/213 |
| 2013/0146545 | A1 * | 6/2013 | Pabalan | C11D 1/8255 210/698 |

* cited by examiner

MICROEMULSION FLOWBACK RECOVERY COMPOSITIONS AND METHODS FOR MAKING AND USING SAME

RELATED APPLICATIONS

This application is a divisional of U.S. patent application Ser. No. 15/478,455 filed Apr. 4, 2017 (4 Apr. 2017), which claims the benefit of and priority to U.S. Provisional Patent Application Ser. No. 62/495,590 filed Apr. 4, 2016 (4 Apr. 2016) and 62/447,007 filed Jan. 17, 2017 (17 Jan. 2017).

BACKGROUND OF THE INVENTION

1. Field of the Invention

Embodiments of the present disclosure relate to microemulsion flowback recovery compositions for use in oil and gas production and methods for making and using same.

More specifically, embodiments of this disclosure relate to microemulsion flowback recovery compositions of water recovery during well stimulation or hydraulic fracturing, where the compositions include non-flammable, non-combustible, non-hazardous, and/or environmentally friendly organic solvent systems.

2. Description of the Related Art

Recovery of injected water has become increasingly important, as the presence of water particularly in the near-wellbore area is detrimental to the production of oil and gas. Drilling and stimulation fluids can increase the connate water saturation of the formation, as can mud drilling fluids by mud filtrates and filter cakes being pushed into pore spaced in the formation blocking pathways for water recovery and oil and/or gas production.

The difficulty in moving fluids that are trapped in the pore spaces of the rock is due largely to capillary pressure. Capillary pressure is the pressure difference across the interface between two immiscible fluids. According to Young-Laplace equation, the capillary pressure ($p_c$) is directly proportional to the interfacial tension ($\gamma$) between two immiscible fluids, and inversely proportional to the radius of the interface (r), given by the following equation.

$$p_c = \frac{2\gamma\cos\theta}{r}$$

The high interfacial tension between oil and water, coupled with a small pore throat radius, results in a high capillary pressure in many oil and gas bearing formations. Surfactants have been used to decrease interfacial tension between oil and water. A reduction in interfacial tension between an injected fluid and hydrocarbons has been achieved using microemulsions. A microemulsion is a thermodynamically stable mixture of oil, water, surfactants, and sometimes solvents and co-solvents. These solvents and co-solvents are commonly referred to as coupling agents. Oil-water-surfactant blends that are used to remove water trapped in the pores of a hydrocarbon-bearing formation are typically referred to as flow-back or water recovery additives. When these water recovery additives are added to a stimulation fluid, the interfacial tension between the aqueous stimulation fluid and the hydrocarbons in the well is reduced by orders of magnitude. The resultant reduction in capillary pressure allows penetration of the stimulation fluid into the pore spaces of the rock, where it can co-mingle with the connate water. During production, the injected fluid is removed, thus opening up pathways for hydrocarbons.

Water recovery additives frequently contain flammable chemicals, such as terpenes and short chain primary alcohols, because they are effective solvents or coupling agents. One example of a coupling agent is isopropanol, which is used to stabilize many different combinations of oil and surfactant. Terpenes, such as d-limonene, are commonly used as the oil phase in water recovery micro emulsions.

The flammability of these solvents makes them hazardous to handle. For instance, d-limonene has a flash point under 140° F. and is a regulated material under the U.S. Department of Transportation. In addition, d-limonene is an aquatic hazard and carries the "dead fish" placard in transit. In light of these drawbacks in known water recovery compositions, there is still a need in the art for compositions that are capable of reducing interfacial tension to levels conducive for water recovery, while avoiding the handling and transportation issues associated with flammable solvents.

SUMMARY OF THE INVENTION

Embodiments of this disclosure provide water recovery microemulsion compositions including: (a) an aqueous system, (b) a surfactant system including: (i) at least one non-ionic surfactant and optionally (ii) at least one co-surfactant selected from the group consisting of non-ionic surfactants, anionic surfactants, and/or cationic surfactants, and (c) a solvent system including at least one solvent (one solvent or a plurality of solvents), where the solvents are selected from the group consisting of a dibasic ester or a plurality of dibasic esters; provided, however, that the final water recovery compositions are non-flammable, non-combustible, non-hazardous, and/or environmentally friendly. In certain embodiments, the solvent system may also include at least one co-solvent or a plurality of co-solvents, where the co-solvents are selected from the group consisting of primary alcohols, glycols, glycol ethers, and mixtures or combinations thereof; provided, however, that the final water recovery compositions are non-flammable, non-combustible, non-hazardous, and/or environmentally friendly. In other embodiments, the water recovery microemulsion compositions may also include a winterizing system. Sometimes the co-solvents are referred to herein as coupling agents.

Embodiments of this disclosure provide methods for water recovery from an oil and/or gas well including circulating a fluid in the well, injecting a fluid in the well, or treating the well with a fluid, where the fluid includes an effective amount of a water recovery microemulsion compositions including: (a) an aqueous system, (b) a surfactant system including: (i) at least one non-ionic surfactant and optionally (ii) at least one co-surfactant selected from the group consisting of non-ionic surfactants, anionic surfactants, and/or cationic surfactants, and (c) a solvent system including at least one solvent (one solvent or a plurality of solvents), where the solvents are selected from the group consisting of a dibasic ester or a plurality of dibasic esters; provided, however, that the final water recovery compositions are non-flammable, non-combustible, non-hazardous, and/or environmentally friendly. In certain embodiments, the solvent system may also include at least one co-solvent or a plurality of co-solvents, where the co-solvents are selected from the group consisting of primary alcohols, glycols, glycol ethers, and mixtures or combinations thereof; provided, however, that the final water recovery compositions are non-flammable, non-combustible, non-hazardous, and/or environmentally friendly. In other embodiments, the water recovery microemulsion compositions may also include a winterizing system.

BRIEF DESCRIPTION OF THE DRAWINGS

The invention can be better understood with reference to the following detailed description together with the appended illustrative drawings in which like elements are numbered the same.

DEFINITIONS OF TERM USED IN THE INVENTION

Figure 1:
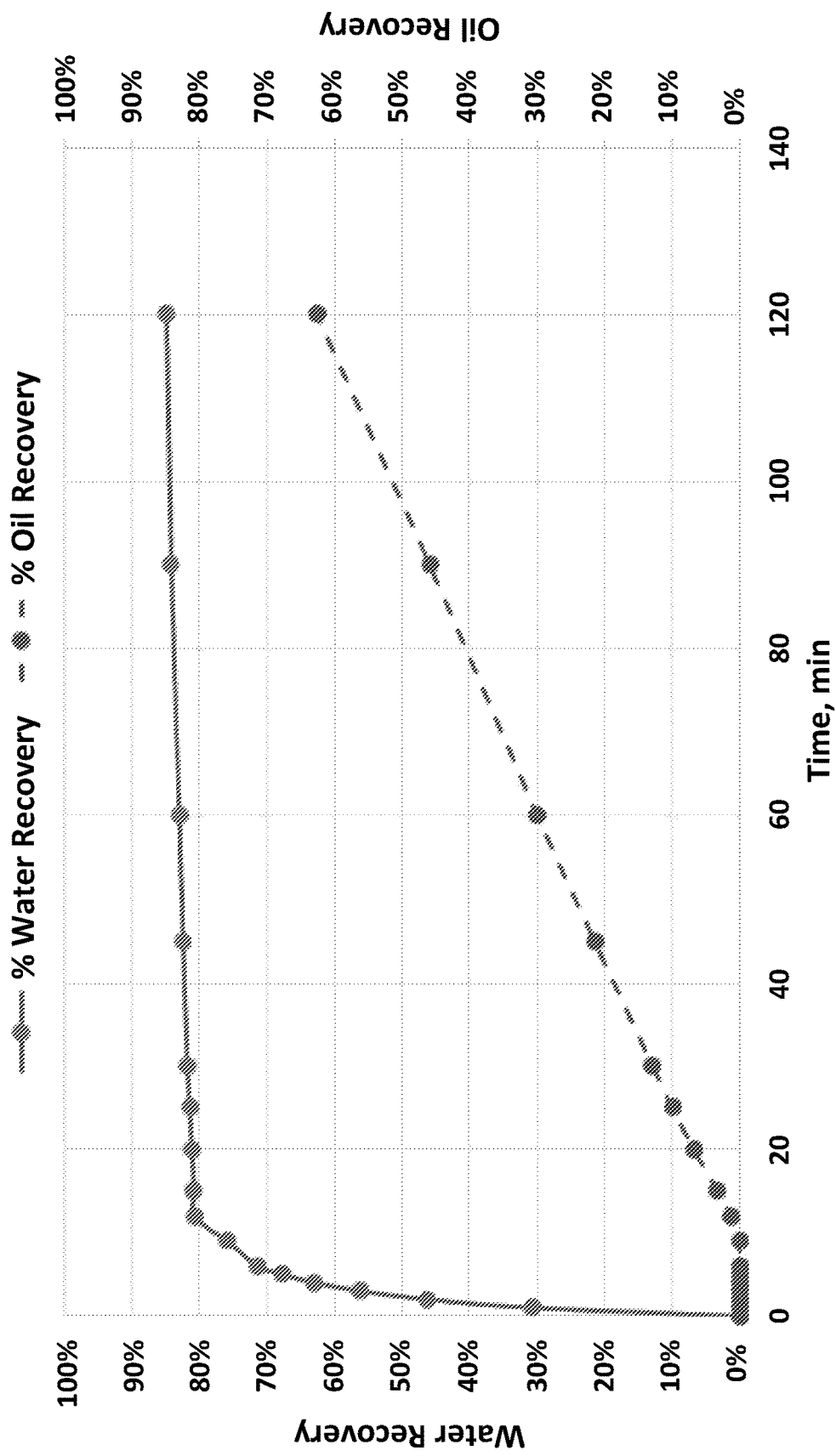
FIG. 1 depicts a plot of % water recovery and % oil recovery vs. time for FBA-Comp.

The following definitions are provided in order to aid those skilled in the art in understanding the detailed description of the present invention.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" means that the value is within about 5% of the indicated value. In certain embodiments, the value is within about 2.5% of the indicated value. In certain embodiments, the value is within about 1% of the indicated value. In certain embodiments, the value is within about 0.5% of the indicated value. In certain embodiments, the value is within about 0.1% of the indicated value.

The term "fracturing fluids" refers to any fluid that is used in fracturing operations for oil and/or gas wells, geo-thermal wells, water wells, injections wells, or other similar wells.

The term "drilling fluids" refers to any fluid that is used during well drilling operations including oil and/or gas wells, geo-thermal wells, water wells or other similar wells.

The term "non-flammable" means a substance having a flash point greater than 140° F.

The term "non-combustible" means a substance having a flash point greater than 200° F.

The term "hazardous" means any substance or material that could adversely affect the safety of the public, handlers, or carriers during transportation. This definition is consistent with the definition employed by the Department of Transportation (DOT) at the time of this disclosure.

The term "non-hazardous" means a substance that does not fit within any one of the nine hazard classes defined by the DOT. These nine classes consist of explosives, compressed gasses, flammable liquids, flammable solids, oxidizers and organic peroxides, toxic materials, radioactive materials, corrosive materials, and miscellaneous.

The term "environmentally friendly" means a substance that is readily biodegradable, non-toxic to aquatic life, and non-hazardous.

The term "carbyl group" or "hydrocarbyl group" means a group including carbon and hydrogen atoms and are attached to a single site of a group, moiety, or atom, where one or more the carbon atoms may be replaced by other atoms or groups, provided that the hydrocarbyl group is stable.

The term "linking group" means a group that links two groups, moieties, or atoms together, the linking groups are sometimes referred herein as hydrocarbenyl groups, where the groups include carbon and hydrogen atoms and are attached to a two or more sites of a group, moiety, or atom, where one or more of the carbon atoms may be replaced by other atoms or groups, provided that the hydrocarbenyl group is stable.

The term "DME" means dimethyl dibasic esters or dimethyl esters of dicarboxylic acids.

The term "microemulsion" means a dispersion made of water, oil, and surfactant(s) that is an isotropic and thermodynamically stable system with dispersed domain diameter varying approximately from 1 to 100 nm, usually 10 to 50 nm (IUPAC definition).

The term "oil-in-water microemulsion" means a microemulsion, where the continuous phase is water or an aqueous phase.

The term "water-in-oil microemulsion" means a microemulsion, where the continuous phase is oil or an organic phase.

The term "gpt" means gallons per thousand gallons.

The term "ppt" means pounds per thousand gallons.

The term "ppg" means pounds per gallon.

The term "mL" means milliliter.

The term "L" means liter.

The terms "wt. %" or "w/w" means weight percent.

The terms "vol. %" or "v/v" means volume percent.

The term "w/v" means weight per volume.

The term "v/w" means volume per weight.

The letters after FBA in the examples denotes the charge of the system, i.e., FBA-C represents a composition including a cationic surfactant, FBA-N a composition including a non-ionic surfactant, etc.

DETAILED DESCRIPTION OF THE INVENTION

The inventors have found that water recovery microemulsion compositions may be formulated that include new solvent systems, where the compositions have equivalent or superior performance to microemulsion compositions including solvent systems that contain terpenes or other solvent systems that are flammable as defined herein, where the new solvent systems are selected so that the final compositions are non-flammable, non-combustible, non-hazardous, and/or environmentally friendly. The inventors have found that the new solvent systems include a dibasic ester or a plurality of dibasic esters, which render the final compositions non-flammable, non-combustible, non-hazardous, and/or environmentally friendly. In certain embodiments, the new solvent systems may also include a co-solvent or a plurality of co-solvents; provided, however, that the final compositions are non-flammable, non-combustible, non-hazardous, and/or environmentally friendly. In addition to the solvent systems being formulated to render the compositions non-flammable, non-combustible, non-hazardous, and/or environmentally friendly, the inventors have found that the compositions may be formulated using surfactant systems that render the final compositions non-flammable, non-combustible, non-hazardous, and/or environmentally friendly. The surfactant systems include surfactants and an optionally co-surfactants. Additionally, individual surfactants and/or co-surfactants may fall outside the definition of non-hazardous as defined herein; provided, however, that the final compositions are non-flammable, non-combustible, non-hazardous, and/or environmentally friendly. In certain embodiments, the surfactant systems comprise a non-ionic surfactant or a plurality of non-ionic surfactants. In other embodiments, the water recovery microemulsion compositions may also include a winterizing system.

The disclosure relates to methods of water recovery during well stimulation or hydraulic fracturing. Recovery of injected water has become increasingly important, as the presence of water—particularly in the near-wellbore area—is detrimental to the production of oil and gas. Drilling fluids can increase the connate water saturation of the formation, as can mud drilling applications. After a mud cake forms on the rock face, mud filtrate is pushed into the pore spaces, increasing the water saturation of the formation and blocking the pathways for oil and gas.

While a coupling agent or a co-solvent is useful for imparting stability to a microemulsion, a properly balanced blend of oil, water, and surfactants does not require a coupling agent in order to remain stable. It is possible to achieve ultralow interfacial tension and thus improve water recovery and hydrocarbon production without the use of the coupling agents or co-solvents described herein. However, as it is easier and more practical to optimize a formulation that achieves the goals of a water recovery additive by including a coupling agent, such coupling agents or co-solvents may often be included in certain embodiments of the present composition.

Embodiments of this disclosure broadly relate to water recovery microemulsion compositions including: (a) an aqueous system, (b) a surfactant system including: (i) at least one non-ionic surfactant and optionally (ii) at least one co-surfactant selected from the group consisting of non-ionic surfactant, anionic surfactant, and/or cationic surfactant, and (c) a solvent system including at least one solvent or one or a plurality of solvents, where the solvents are selected from the group consisting of a dibasic ester or a plurality of dibasic esters; provided, however, that the final water recovery compositions are non-flammable, non-combustible, non-hazardous, and environmentally friendly. In certain embodiments, the solvent system may also include at least one co-solvent or a plurality of co-solvents, where the co-solvents are selected from the group consisting of primary alcohols, glycols, glycol ethers, and mixtures or combinations thereof; provided, however, that the final water recovery compositions are non-flammable, non-combustible, non-hazardous, and environmentally friendly. In certain embodiments, the aqueous systems includes fresh water, deionized (DI) water, distilled water, brines, produced water, any water that forms stable microemulsions capable of reducing interfacial tension between a treating fluid and connate hydrocarbons, and mixtures or combinations thereof. In other embodiments, the water recovery microemulsion compositions may also include a winterizing system.

Embodiments of this disclosure broadly relate to methods for water recovery from an oil and/or gas well including circulating a fluid in the well, where the fluid includes an effective amount of a water recovery microemulsion composition including: (a) an aqueous system, (b) a surfactant system including: (i) at least one non-ionic surfactant and optionally (ii) at least one co-surfactant selected from the group consisting of non-ionic surfactants, anionic surfactants, and/or cationic surfactants, and (c) a solvent system including at least one solvent or one or a plurality of solvents, where the solvents are selected from the group consisting of a dibasic ester or a plurality of dibasic esters; provided, however, that the final water recovery compositions are non-flammable, non-combustible, non-hazardous, and environmentally friendly. In certain embodiments, the solvent system may also include at least one co-solvent or a plurality of co-solvents, where the co-solvents are selected from the group consisting of primary alcohols, glycols, glycol ethers, and mixtures or combinations thereof; provided, however, that the final water recovery compositions are non-flammable, non-combustible, non-hazardous, and environmentally friendly. In certain embodiments, the aqueous systems includes fresh water, deionized (DI) water, distilled water, brines, produced water, any water that forms stable microemulsions capable of reducing interfacial tension between a treating fluid and connate hydrocarbons, and mixtures or combinations thereof. In other embodiments, the water recovery microemulsion compositions may also include a winterizing system.

In certain embodiments, the microemulsion compositions are water-in-oil microemulsions or oil-in-water microemulsions.

Compositional Ranges

Microemulsion Compositional Ranges

In certain embodiments, the compositions are oil-in-water microemulsions having the following compositional makeup of solvent system to aqueous system.

| Solvent System (wt. %) | Aqueous System (wt. %) |
|---|---|
| 1 to 49.9 | 99 to 50.1 |
| 5 to 49.9 | 95 to 50.1 |
| 10 to 49.9 | 90 to 50.1 |
| 20 to 49.9 | 80 to 50.1 |
| 30 to 49.9 | 70 to 50.1 |

| Solvent System (wt. %) | Aqueous System (wt. %) | Surfactant System (wt. %) |
|---|---|---|
| 10 to 30 | 80 to 40 | 10 to 30 |
| 15 to 30 | 70 to 40 | 15 to 30 |
| 20 to 30 | 60 to 40 | 20 to 30 |

In certain embodiments, the solvent systems include dibasic esters present in an amount ranging between about 0.1% and about 50% by weight. In other embodiments, the solvent systems include dibasic esters are present in an amount ranging between about 1% and about 25%. In other embodiments, the solvent systems include dibasic esters are present in an amount ranging between about 5% and about 15%.

Surfactant System Ranges

In certain embodiments, the surfactant systems include: (a) a surfactant or a plurality of surfactants or (b) a surfactant or a plurality of surfactants and a co-surfactant or a plurality of co-surfactants present in the amounts set forth in the following table:

| Surfactant (wt. %) | Co-Surfactant (wt. %) |
|---|---|
| 100 to 50 | 0 to 50 |
| 2 to 40 | 0 to 20 or 1 to 20 or 5 to 20 or 10 to 20 |
| 5 to 40 | 0 to 20 or 1 to 20 or 5 to 20 or 10 to 20 |
| 10 to 40 | 0 to 20 or 1 to 20 or 5 to 20 or 10 to 20 |
| 15 to 40 | 0to 20 or 1 to 20 or 5 to 20 or 10 to 20 |
| 1 to 20 | 1 to 20 or 2 to 16 or 3 to 12 |
| 2 to 16 | 1 to 20 or 2 to 16 or 3 to 12 |
| 3 to 12 | 1 to 20 or 2 to 16 or 3 to 12 |

In certain embodiments, the surfactant or the surfactants include a non-ionic surfactant or a plurality of non-ionic surfactants and the co-surfactant including a non-ionic surfactant, an anionic surfactant, a cationic surfactant, or a mixture of two or more of the surfactant types.

In certain embodiments, the nonionic surfactant is present in the composition in an amount ranging between about 5% and about 40% by weight. In other embodiments, the nonionic surfactant is present in the composition in an amount ranging between about 7% and about 30% by weight. In other embodiments, the nonionic surfactant is present in the composition in an amount ranging between about 10% and about 20% by weight.

In certain embodiments, the co-surfactant is present in the composition in an amount ranging between about 5% and about 40% by weight. In other embodiments, the co-surfactant is present in the composition in an amount ranging between about 7% and about 30% by weight. In other embodiments, the co-surfactant is present in the composition in an amount ranging between about 10% and about 20% by weight.

Solvent System

In certain embodiments, the solvent systems include: (a) a solvent or a plurality of solvents or (b) a solvent or a plurality of solvents and a co-solvent or a plurality of co-solvents present in the amounts set forth in the following table:

| Solvent (wt. %) | Co-Solvent (wt. %) |
|---|---|
| 1 to 40 | 0 to 20 or 1 to 20 or 5 to 20 or 10 to 20 |
| 2 to 40 | 0 to 20 or 1 to 20 or 5 to 20 or 10 to 20 |
| 5 to 40 | 0 to 20 or 1 to 20 or 5 to 20 or 10 to 20 |
| 10 to 40 | 0 to 20 or 1 to 20 or 5 to 20 or 10 to 20 |
| 15 to 40 | 0 to 20 or 1 to 20 or 5 to 20 or 10 to 20 |
| 1 to 20 | 1 to 20 or 2 to 16 or 3 to 12 |
| 2 to 16 | 1 to 20 or 2 to 16 or 3 to 12 |
| 3 to 12 | 1 to 20 or 2 to 16 or 3 to 12 |

In certain embodiments, the plurality of solvents comprise mixtures of dimethyl succinate, dimethyl glutarate and dimethyl adipate present in the amounts set forth in the following table:

| dimethyl succinate (wt. %) | dimethyl glutarate (wt. %) | dimethyl adipate (wt. %) |
|---|---|---|
| 0 to 1 | 50 to 74 | 50 to 25 |
| 0 to 5 | 50 to 72.5 | 50 to 22.5 |
| 0 to 10 | 50 to 70 | 50 to 20 |
| 0 to 15 | 50 to 67.5 | 50 to 17.5 |
| 0 to 20 | 50 to 65 | 50 to 15 |
| 0 to 25 | 50 to 62.5 | 50 to 12.5 |
| 10 to 30 | 85 to 50 | 5 to 20 |
| 15 to 30 | 75 to 50 | 10 to 20 |
| 15 to 25 | 75 to 55 | 10 to 20 |

In other embodiments, the co-solvent or co-solvents may be used to assist in microemulsification of the water-oil-surfactant compositions, or to provide stability to the compositions.

In other embodiments, the co-solvent or co-solvents are useful for imparting stability to a microemulsion; however, a properly balanced blend of oil, water, and surfactants does not require a co-solvent or co-solvents in order to remain stable. It is possible to achieve ultralow interfacial tension and thus to improve water recovery and hydrocarbon production without the use of the co-solvent or co-solvents described herein.

In certain embodiments, the dibasic ester solvent system of the present composition includes dimethyl succinate, dimethyl glutarate, dimethyl adipate, or mixtures thereof. In other embodiments, the dibasic ester solvent system of the present invention include a blend or a mixture of dimethyl succinate, dimethyl glutarate, and dimethyl adipate.

In certain embodiments, blends of dibasic esters represent a more cost effective solvent system having lower pour points as compared to than individual dibasic esters. In other embodiments, the dibasic ester solvent systems of this invention include any ratio of dimethyl succinate, dimethyl glutarate, and/or dimethyl adipate. In other embodiments, the dibasic ester solvent systems of this invention include between about 15 wt. % and about 30 wt. % of dimethyl succinate, between about 55 wt. % and about 75 wt. % of dimethyl glutarate, and between about 6 wt. % and about 22 wt. % of dimethyl adipate. In other embodiments, between about 17 wt. % and about 27 wt. % dimethyl succinate, between about 58 wt. % and about 72 wt. % of dimethyl glutarate, and between about 8 wt. % and about 20 wt. % of dimethyl adipate. In other embodiments, between about 20 wt. % and about 25 wt. % of dimethyl succinate, between about 61 wt. % and about 69 wt. % of dimethyl glutarate, and between about 10 wt. % and about 18 wt. % of dimethyl adipate.

In certain embodiments, the dibasic esters are present in the present compositions in an amount ranging between about 0.1 wt. % and about 60 wt. %. In other embodiments, the dibasic esters are present in an amount in the compositions in an amount ranging between about 5 wt. % and about 40 wt. %. In other embodiments, the dibasic esters are present in an amount in the compositions in an amount ranging between about 10 wt. % and about 20 wt. %.

Downhole Fluids Including Microemulsions

In certain embodiments, the microemulsion compositions are added to a stimulation fluid in an effective amount ranging between about 50 ppm and about 5000 ppm. In other embodiments, the microemulsion compositions are added to a stimulation fluid in an effective amount ranging between about 100 ppm and about 5000 ppm. In other embodiments, the microemulsion compositions are added to a stimulation fluid in an effective amount ranging between about 250 ppm and about 5000 ppm. In other embodiments, the microemulsion compositions are added to a stimulation fluid in an effective amount ranging between about 500 ppm and about 5000 ppm. In other embodiments, the microemulsion compositions are added to a stimulation fluid in an effective amount ranging between about 50 ppm and about 4000 ppm.

In other embodiments, the microemulsion compositions are added to a stimulation fluid in an effective amount ranging between about 100 ppm and about 4000 ppm. In other embodiments, the microemulsion compositions are added to a stimulation fluid in an effective amount ranging between about 250 ppm and about 4000 ppm. In other embodiments, the microemulsion compositions are added to a stimulation fluid in an effective amount ranging between about 500 ppm and about 4000 ppm. In other embodiments, the microemulsion compositions are added to a stimulation fluid in an effective amount ranging between about 50 ppm and about 2500 ppm. In other embodiments, the microemulsion compositions are added to a stimulation fluid in an effective amount ranging between about 100 ppm and about 2500 ppm. In other embodiments, the microemulsion compositions are added to a stimulation fluid in an effective amount ranging between about 250 ppm and about 2500 ppm. In other embodiments, the microemulsion compositions are added to a stimulation fluid in an effective amount ranging between about 500 ppm and about 2500 ppm.

Suitable Reagents

Aqueous Systems

Suitable aqueous systems used in the compositions of the present disclosure include, without limitation, fresh water, deionized (DI) water, distilled water, brines, produced water, any water that forms stable microemulsions capable of reducing interfacial tension between a treating fluid and connate hydrocarbons, and mixtures or combinations thereof.

Surfactant Systems

Suitable surfactant systems used in the compositions of the present invention include, without limitation, non-flammable, non-combustible, non-hazardous, and/or environmentally friendly surfactants and co-surfactants. In certain embodiments, the surfactants and co-surfactants may fall outside the definition of non-hazardous, and still be suitable for use in the present disclosure; provided, however, that the resulting water recovery microemulsion compositions are non-hazardous.

Non-Ionic Surfactants

Suitable non-ionic surfactants used in the compositions of the present disclosure include, without limitation, linear alcohol alkoxylates, branched alcohol alkoxylates, secondary alcohol alkoxylates, tridecyl alcohol alkoxylates, Guerbet alcohol alkoxylates, castor oil alkoxylates, fatty acid alkoxylates, alkylphenol alkoxylates, terpene alkoxylates, sorbitan esters, sorbitan ester alkoxylates, alkyl polyglucosides, polyoxyethylene glycol alkyl ethers, polyoxypropylene glycol alkyl ethers, polyoxyethylene glycol alkylphenol ethers, glycerol alkyl esters, tall oil fatty acid alkyl esters, amides, disubstituted amides, alkanolamides, alkanolamide alkoxylates, and mixtures thereof Guerbet Alcohols Suitable Guerbet alcohols used in the compositions of the present invention include, without limitation, compounds of the general formula $CH_3(CH_2)_{x+1}CH(CH_2OH)(CH_2)_{x-1}CH_3$, where x is an integer having a value between 1 and 30.

Anionic Co-Surfactants

Suitable anionic co-surfactants used in the compositions of the present disclosure include, without limitation, alkylbenzenesulfonates, linear alkylbenzene sulfonates, linear alkylamine salts of alkylbenzenesulfonic acids, branched alkylamine salts of alkylbenzenesulfonic acids, sodium alkylbenzenesulfonates, calcium alkylbenzenesulfonates, magnesium alkylbenzenesulfonates, sodium alkyl sulfates, sodium dialkylsulfosuccinates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, sarcosinates, taurinates, any other anionic surfactant, and mixtures thereof.

Cationic Co-Surfactants

Suitable cationic co-surfactant used in the compositions of the present disclosure include, without limitation, tertahydrcarbyl ammonium salts, tri-hydrocarbyl, hydrogen ammonium salts, di-hydrocarbyl, dihydrogen ammonium salts, mono-hydrocarbyl, trihydrogen ammonium salts, terta-hydrcarbyl phosphonium salts, tri-hydrocarbyl, hydrogen phosphonium salts, di-hydrocarbyl, dihydrogen phosphonium salts, mono-hydrocarbyl, trihydrogen phosphonium salts, and mixtures thereof, where the salts include, without limitation, a halide ion selected from the group consisting of a fluoride ion, a chloride ion, a bromide ion, and an iodide ion, a hydroxide ion, a phosphate ion, a phosphonate ion, a sulfate ion, a sulfonate ion, a carboxylate ion, and mixtures thereof. Exemplary examples include, without limitation, n-alkyl trimethyl ammonium chloride, n-alkyl trimethyl ammonium bromide, n-alkyl dimethyl benzylammonium chloride, dialkyl dimethylammonium chloride, dialkylester ammonium methosulfate, any other cationic surfactant, and mixtures thereof.

Solvent Systems

Suitable solvent systems used in the compositions of the present disclosure include, without limitation, one solvent or a plurality of solvents alone or in conjunction with a co-solvent or a plurality of co-solvents.

Solvents

Suitable solvents used in the compositions of the present disclosure include, without limitation, a dibasic ester or a plurality of dibasic esters diesters of dicarboxylic acids.

Suitable dibasic esters or diesters used in the compositions of the present disclosure include, without limitation, linear, branched, and/or cyclic compounds and have the following formula:

$$R^1OOC-R-COOR^2$$

where $R^1$, and $R^2$ are independently hydrocarbyl groups having between 1 and 20 carbon atoms and R is a linking group (groups that link two groups or moieties, sometimes referred to herein as hydrocarbenyl groups alkenyl groups, arenyl groups) having between 1 and 30 carbon atoms, where one or more of the hydrogen atoms may be replaced by halogen atoms, alkoxy groups, amide groups, and/or relatively inert groups and one or more of the carbon atoms may be replace by an oxygen atom or a sulfur atom. The hydrocarbyl groups may be alkyl groups, aryl groups, aralkyl groups, alkaryl groups, heterocyclic groups, or mixtures and combinations thereof. The alkyl groups or moieties (alkyl portion of aralkyl and alkaryl group) may be saturated or unsaturated, linear, branched, and/or cyclic. The linking groups are hydrocarbenyl groups (groups that link two groups or moieties). The hydrocarbenyl groups may be alkenyl, arenyl, aralkenyl, alkarenyl, heterocyclic, or mixtures and combinations thereof. The alkyl groups or moieties (alkyl portion of aralkyl and alkaryl group) may be saturated or unsaturated, linear, branched, and/or cyclic. Applicants recognize that the definition of a linking group and the use of the terminology "hydrocarbenyl group" as representing a linking group may be non-conventional, but it is used to distinguish groups bonded to a single group or moiety from groups bonded to or linking two or more groups or moieties.

In certain embodiments, the diesters used in the compositions of the present disclosure include, without limitation, compounds of the following formulas:

$R^1OOC$-alkenyl-$COOR^2$ $R^1OOC$-aralkenyl-$COOR^2$ $R^1OOC$-alkarenyl-$COOR^2$ $R^1OOC$-heterocyclic-$COOR^2$ where the R, $R^1$ and $R^2$ groups are defined above.

In other embodiments, the diesters used in the compositions of the present disclosure include, without limitation, compounds of the following formulas:

$R^1OOC$—$(CH_2)_q$—$COOR^2$ $R^1OOC$—$(CR^3R^4)_q$—$COOR^2$ $R^1OOC$—$(CR^3R^4)_r$—$(CH_2)_{q2}$—$COOR^2$ $R^1OOC$—$(CH_2)_{q1}$—$(CR^3R^4)_r$—$COOR^2$ $R^1OOC$—$(CH_2)_{q3}$—$(CR^3R^4)_r$—$(CH_2)_{q4}$—$COOR^2$ where q is an integer having a value between 1 and 10, q1 is an integer having a value between 1 and 10, q2 is an integer having a value between 1 and 10, q3 and q4 are integers having values between 1 and 10, r is an integer having a value between 1 and 10, $R^3$ and $R^4$ may independently be a hydrogen atom or a hydrocarbyl group having between 1 and 20 carbon atoms or may form a cyclic group, and the R, $R^1$ and $R^2$ groups are defined above.

In other embodiments, the diesters used in the compositions of the present disclosure include, without limitation, diesters of the following diacids:

| Common Name | IUPAC Name | Formula | Isomer |
|---|---|---|---|
| oxalic acid | ethanedioic acid | $R^1OOC - COOR^2$ | |
| malonic acid | propanedioic acid | $R^1OOC - CH_2 - COOR^2$ | |
| succinic acid | butanedioic acid | $R^1OOC - (CH_2)_2 - COOR^2$ | |
| glutaric acid | pentanedioic acid | $R^1OOC - (CH_2)_3 - COOR^2$ | |
| adipic acid | hexanedioic acid | $R^1OOC - (CH_2)_4 - COOR^2$ | |
| pimelic acid | heptanedioic acid | $R^1OOC - (CH_2)_5 - COOR^2$ | |
| suberic acid | octanedioic acid | $R^1OOC - (CH_2)_6 - COOR^2$ | |
| azelaic acid | nonanedioic acid | $R^1OOC - (CH_2)_7 - COOR^2$ | |
| sebacic acid | decanedioic acid | $R^1OOC - (CH_2)_8 - COOR^2$ | |
| brassilic acid | undecanedioic acid | $R^1OOC - (CH_2)_9 - COOR^2$ | |
| | dodecanedioic acid | $R^1OOC - (CH_2)_{10} - COOR^2$ | |
| | tridecanedioic acid | $R^1OOC - (CH_2)_{11} - COOR^2$ | |
| | tetradecanedioic acid | $R^1OOC - (CH_2)_{12} - COOR^2$ | |
| | pentadecanedioic acid | $R^1OOC - (CH_2)_{13} - COOR^2$ | |
| thapsic acid | hexadecanedioic acid | $R^1OOC - (CH_2)_{14} - COOR^2$ | |
| maleic acid | (Z)-butenedioic acid | $R^1OOC - CH = CH - COOR^2$ | cis |
| fumaric acid | (E)-butenedioic acid | $R^1OOC - CH = CH - COOR^2$ | trans |
| glutaconic acid | pent-2-enedioic acid | $R^1OOC - CH_2 - CH = CH - COOR^2$ | cis & trans |
| traumatic acid | dodec-2-enedioic acid | $R^1OOC - CH = CH - (CH_2)_8 - COOR^2$ | trans |
| muconic acid | (2E,4E)-hexa-2,4-dienedioic acid | $R^1OOC - CH = CH - CH = CH- COOR^2$ | trans, trans cis, trans cis, cis |
| glutinic acid | (RS)-2,3-pentadiene dioic acid | $R^1OOC - CH = C = CH - COOR^2$ | |
| citraconic acid | (2Z)-2-methylbut-2-enedioic acid | $R^1OOC - CH = C(CH_3) - COOR^2$ | cis |
| mesaconic acid | (2E)-2-methyl-2-butenedioic acid | $R^1OOC - CH = C(CH_3) - COOR^2$ | trans |
| itaconic acid | | $R^1OOC - CH_2 - C(=CH_2) - COOR^2$ | |
| crocetin | | $R^1OOC - C(CH_3) = CH - CH = CH - C(CH_3) = CH - CH = CH - CH = C(CH_3) - CH = CH - CH = C(CH_3) - COOR^2$ | all trans |
| malic acid | hydroxybutanedioic acid | $R^1OOC - CH_2 - CH(OH) - COOR^2$ | |
| aspartic acid | 2-aminobutanedioic acid | $R^1OOC - CH_2 - CH(NH_2) - COOR^2$ | |
| glutamic acid | 2-aminopentanedioic acid | $R^1OOC - (CH_2)_2 - CH(NH_2) - COOR^2$ | |
| tartronic acid | 2-hydroxy propanedioic acid | $R^1OOC - CH(OH) - COOR^2$ | |
| tartaric acid | 2,3-dihydroxy butanedioic acid | $R^1OOC - CH(OH) - CH(OH) - COOR^2$ | |
| diaminopimelic acid | (2R,6S)-2,6-diamino heptanedioic acid | $R^1OOC - CH(NH_2) - (CH_2)_4 - CH(NH_2) - COOR^2$ | |
| saccharic acid | (2S,3S,4S,5R)-2,3,4,5-tetrahydroxy hexanedioic acid | $R^1OOC - (CH(OH))_5 - COOR^2$ | |
| mesoxalic acid | oxopropanedioic acid | $R^1OOC - C(O) - COOR^2$ | |
| oxaloacetic acid | oxobutanedioic acid | $R^1OOC - C(O) - CH_2 - C(O) - COOR^2$ | |
| acetone dicarboxylic acid | 3-oxopentanedioic acid | $R^1OOC - CH_2 - C(O) - CH_2 - COOR^2$ | |
| arabinaric acid | 2,3,4-trihydroxy pentanedioic acid | $R^1OOC - (CH(OH))_3 - COOR^2$ | |

-continued

| Common Name | IUPAC Name | Formula | Isomer |
|---|---|---|---|
| o-phthalic acid | benzene-1,2-dicarboxylic acid | $R^1OOC$ – o-phenyl – $COOR^2$ | |
| m-phthalic acid | benzene-1,3-dicarboxylic acid | $R^1OOC$ – m-phenyl – $COOR^2$ | |
| p-phthalic acid | benzene-1,4-dicarboxylic acid | $R^1OOC$ – p-phenyl – $COOR^2$ | |
| biphenyl-2,2-dicarboxylic acid | 2-(2-carboxyphenyl) benzoic acid | $R^1OOC$ – o-phenyl – o-phenyl – $COOR^2$ | |
| 2,6-naphthalene dicarboxylic acid | 2,6-naphthalene dicarboxylic acid | $R^1OOC$ – 2-6-naphthenyl – $COOR^2$ | |

In other embodiments, the diesters used in the compositions of the present disclosure include, without limitation, dialkyl succinate, dialkyl glutarate, dialkyl glutarate, dialkyl adipate, dialkyl adipicate, dialkyl pimelicate, dialkyl subericate, dialkyl azelaicate, dialkyl sebacicate, dialkyl brassylicate, dialkyl dodecanedioicate, dialkyl traumaticate, dialkyl thapsicate, or mixtures and combinations thereof.

In other embodiments, the diesters used in the compositions of the present disclosure include, without limitation, dimethyl succinate, dimethyl glutarate, dimethyl glutarate, dimethyl adipate, dimethyl adipicate, dimethyl pimelicate, dimethyl subericate, dimethyl azelaicate, dimethyl sebacicate, dimethyl brassylicate, dimethyl dodecanedioicate, dimethyl traumaticate, dimethyl thapsicate, methyl, ethyl succinate, methyl, ethyl glutarate, methyl, ethyl glutarate, methyl, ethyl adipate, methyl, ethyl adipicate, methyl, ethyl pimelicate, methyl, ethyl subericate, methyl, ethyl azelaicate, methyl, ethyl sebacicate, methyl, ethyl brassylicate, methyl, ethyl dodecanedioicate, methyl, ethyl traumaticate, methyl, ethyl thapsicate, diethyl succinate, diethyl glutarate, diethyl glutarate, diethyl adipate, diethyl adipicate, diethyl pimelicate, diethyl subericate, diethyl azelaicate, diethyl sebacicate, diethyl brassylicate, diethyl dodecanedioicate, diethyl traumaticate, diethyl thapsicate, or mixtures and combinations thereof.

The dibasic esters for use in the present disclosure have low toxicity, have low VOCs, and are non-flammable. Additionally, dibasic esters have more reliable sources than terpenes such as d-limonene, the availability of which often depends on citrus crop yields.

Co-Solvents

Suitable co-solvents used in the compositions of the present invention include, without limitation, primary alcohols, glycols, or glycol ethers; provided, however, that the final water recovery compositions are non-flammable, non-combustible, non-hazardous, and environmentally friendly.

Primary Alcohols

Suitable primary alcohols used in the compositions of the present invention include, without limitation, heptanol, octanol, nonanol, decanol, dodecanol, benzyl alcohol, and mixtures thereof Glycol Ethers Suitable glycol ethers used in the compositions of the present invention include, without limitation, ethylene glycol monomethyl ether, ethylene glycol monoethyl ether, ethylene glycol monopropyl ether, ethylene glycol monoisopropyl ether, ethylene glycol monobutyl ether, ethylene glycol monohexyl ether, ethylene glycol monophenyl ether, ethylene glycol monobenzyl ether, diethylene glycol monomethyl ether, diethylene glycol monoethyl ether, diethylene glycol monomethyl ether, diethylene glycol monobutyl ether, diethylene glycol monohexyl ether, triethylene glycol monomethyl ether, triethylene glycol monoethyl ether, triethylene glycol monobutyl ether, propylene glycol methyl ether, dipropylene glycol methyl ether, tripropylene glycol methyl ether, propylene glycol n-propyl ether, dipropylene glycol n-propyl ether, dipropylene glycol n-butyl ether, propylene glycol n-butyl ether, tripropylene glycol n-butyl ether, and mixtures thereof.

Winterizing Systems

Suitable winterizing systems used in the compositions of the present invention include, without limitation, a glycol or a plurality of glycols.

Glycols

Suitable glycols used in the compositions of the present invention include, without limitation, ethylene glycol, diethylene glycol, triethylene glycol, propylene glycol, dipropylene glycol, tripropylene glycol, butanediol, and mixtures thereof.

EXPERIMENTS OF THE INVENTION

In the following example embodiment, the weight percentages shown are intended only as rough approximations.

GENERAL EXAMPLES

Example 1—Glycol Ether, Non-Ionic Microemulsion

This example illustrates the preparation of a microemulsion of this disclosure, which includes a solvent system containing a glycol ether, and a surfactant system containing a mixture of two non-ionic surfactants.

The composition used the following ingredient at the indicated weight percentages.

| wt. % | Ingredient |
|---|---|
| 40 | DI water |
| | Surfactant System |
| 20 | a first non-ionic surfactant |
| 20 | a second non-ionic surfactant |
| | Solvent System |
| 20 | glycol ether |

The surfactant system was added to the solvent system with stirring in an appropriate vessel and mixed until homogeneous. The resulting mixture was then added to the water with stirring sufficient to form a microemulsion. The non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 2—Winterized Glycol Ether, Non-Ionic Microemulsion

This example illustrates the preparation of a microemulsion of this disclosure, which includes a solvent system containing a glycol ether, a surfactant system containing a mixture of two non-ionic surfactants, and a winterizing system.

The composition used the following ingredient at the indicated weight percentages.

| wt. % | Ingredient |
|---|---|
| 40 | DI Water |
|  | Surfactant System |
| 15 | a first non-ionic surfactant |
| 15 | a second non-ionic surfactant |
|  | Solvent System |
| 15 | glycol ether |
|  | Winterizing System |
| 15 | glycol |

The surfactant system was added to the solvent system and the winterizing system with stirring in an appropriate vessel and mixed until homogeneous. The resulting mixture was then added to the water with stirring sufficient to form a microemulsion. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 3—DME, Non-Ionic Microemulsion

This example illustrates the preparation of a microemulsion of this disclosure, which includes a solvent system containing DME, a blend of dimethyl esters of diacids or dimethyl dibasic esters, and a surfactant system containing a mixture of two non-ionic surfactants.

The composition used the following ingredient at the indicated weight percentages.

| wt. % | Ingredient |
|---|---|
| 40 | DI water |
|  | Surfactant System |
| 20 | a first non-ionic surfactant |
| 20 | a second non-ionic surfactant |
|  | Solvent System |
| 20 | DME |

The surfactant system was added to the solvent system with stirring in an appropriate vessel and mixed until homogeneous. The resulting mixture was then added to the water with stirring sufficient to form a microemulsion. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 4—Winterized DME, Non-Ionic Microemulsion

This example illustrates the preparation of a microemulsion of this disclosure, which includes a solvent system containing DME, a blend of dimethyl esters of diacids or dimethyl dibasic esters, and a surfactant system containing a mixture of two non-ionic surfactants.

The composition used the following ingredient at the indicated weight percentages.

| wt. % | Ingredient |
|---|---|
| 40 | DI Water |
|  | Surfactant System |
| 15 | a first non-ionic surfactant |
| 15 | a second non-ionic surfactant |
|  | Solvent System |
| 15 | DME |
|  | Winterizing System |
| 15 | glycol |

The surfactant system was added to the solvent system and the winterizing system with stirring in an appropriate vessel and mixed until homogeneous. The resulting mixture was then added to the water with stirring sufficient to form a microemulsion. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 5—Glycol Ether/DME, Non-Ionic Microemulsion

This example illustrates the preparation of a microemulsion of this disclosure, which includes a solvent system containing a glycol ether and DME, a blend of dimethyl esters of diacids or dimethyl dibasic esters, and a surfactant system containing a mixture of two non-ionic surfactants.

The composition used the following ingredient at the indicated weight percentages.

| wt. % | Ingredient |
|---|---|
| 40 | DI Water |
|  | Surfactant System |
| 15 | a first non-ionic surfactant |
| 15 | a second non-ionic surfactant |
|  | Solvent System |
| 15 | glycol ether |
| 15 | DME |

The surfactant system was added to the solvent system with stirring in an appropriate vessel and mixed until homogeneous. The resulting mixture was then added to the water with stirring sufficient to form a microemulsion. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 6—Winterized Glycol Ether/DME, Non-Ionic Microemulsion

This example illustrates the preparation of a microemulsion of this disclosure, which includes a solvent system containing a glycol ether and DME, a blend of dimethyl esters of diacids or dimethyl dibasic esters, a surfactant system containing a mixture of two non-ionic surfactants, and a winterizing system.

The composition used the following ingredient at the indicated weight percentages.

| wt. % | Ingredient |
|---|---|
| 40 | DI Water |
| | Surfactant System |
| 10 | a first non-ionic surfactant |
| 10 | a second non-ionic surfactant |
| | Solvent System |
| 10 | glycol ether |
| 20 | DME |
| | Winterizing System |
| 10 | glycol |

The surfactant system was added to the solvent system and the winterized system with stirring in an appropriate vessel and mixed until homogeneous. The resulting mixture was then added to the water with stirring sufficient to form a microemulsion. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 7—Glycol Ether/DME, Cationic Microemulsion

This example illustrates the preparation of a cationic microemulsion of this disclosure, which includes a solvent system containing a glycol ether, and DME, a blend of dimethyl esters of diacids or dimethyl dibasic esters, and a surfactant system containing a mixture of a non-ionic surfactant and a cationic surfactant.

The composition used the following ingredient at the indicated weight percentages.

| wt. % | Ingredient |
|---|---|
| 40 | DI water |
| | Surfactant System |
| 15 | a cationic surfactant |
| 15 | a non-ionic surfactant |
| | Solvent System |
| 15 | glycol ether |
| 15 | DME |

The surfactant system was added to the solvent system with stirring in an appropriate vessel and mixed until homogeneous. The resulting mixture was then added to the water with stirring sufficient to form a microemulsion. The cationic surfactant may be any cationic surfactant set forth herein. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 8—Winterized Glycol Ether/DME, Cationic Microemulsion

This example illustrates the preparation of a cationic microemulsion of this disclosure, which includes a solvent system containing a glycol ether, and DME, a blend of dimethyl esters of diacids or dimethyl dibasic esters, and a surfactant system containing a mixture of a non-ionic surfactant and a cationic surfactant.

The composition used the following ingredient at the indicated weight percentages.

| wt. % | Ingredient |
|---|---|
| 40 | DI water |
| | Surfactant System |
| 10 | a cationic surfactant |
| 10 | a non-ionic surfactant |
| | Solvent System |
| 10 | glycol ether |
| 40 | DI water |
| 20 | DME |
| | Winterizing System |
| 10 | glycol |

The surfactant system was added to the solvent system and the winterizing system with stirring in an appropriate vessel and mixed until homogeneous. The resulting mixture was then added to the water with stirring sufficient to form a microemulsion. The cationic surfactant may be any cationic surfactant set forth herein. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 9—Glycol Ether/DME, Anionic Microemulsion

This example illustrates the preparation of a microemulsion of this disclosure, which includes a solvent system comprising a glycol ether and DME, a blend of dimethyl esters of diacids or dimethyl dibasic esters, and a surfactant system containing a mixture of a non-ionic surfactant and an anionic surfactant.

The composition used the following ingredient at the indicated weight percentages.

| wt. % | Ingredient |
|---|---|
| 40 | DI Water |
| | Surfactant System |
| 15 | an anionic surfactant |
| 15 | a non-ionic surfactant |
| | Solvent System |
| 15 | glycol ether |
| 15 | DME |

The surfactant system was added to the solvent system with stirring in an appropriate vessel and mixed until homogeneous. The resulting mixture was then added to the water with stirring sufficient to form a microemulsion. The anionic surfactant may be any anionic surfactant set forth herein. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

Example 10—Winterized Glycol Ether/DME, Anionic Microemulsion

This example illustrates the preparation of a microemulsion of this disclosure, which includes a solvent system comprising a glycol ether, and DME, a blend of dimethyl esters of diacids or dimethyl dibasic esters, and a surfactant system containing a mixture of a non-ionic surfactant and an anionic surfactant.

The composition used the following ingredient at the indicated weight percentages.

| wt. % | Ingredient |
|---|---|
| 40 | DI Water |
| | Surfactant System |
| 10 | an anionic surfactant |
| 10 | a non-ionic surfactant |
| | Solvent System |
| 10 | glycol ether |
| 20 | DME |
| | Winterizing System |
| 10 | glycol |

The surfactant system was added to the solvent system and the winterizing system with stirring in an appropriate vessel and mixed until homogeneous. The resulting mixture was then added to the water with stirring sufficient to form a microemulsion. The anionic surfactant may be any anionic surfactant set forth herein. Again, the non-ionic surfactants may be any non-ionic surfactant set forth herein such as a secondary alcohol ethoxylate non-ionic surfactant, a trialkyl alcohol ethoxylate non-ionic surfactant, a linear alcohol ethoxylate non-ionic surfactant, and/or a fatty acid ethoxylate surfactant.

COMPARATIVE EXAMPLES

Example FBA-COMP

This comparative example illustrates the preparation of a prior art or comparative microemulsion, which includes a surfactant system containing a non-ionic surfactant and a cationic surfactant and a solvent system containing d-limonene as a solvent and isopropanol as a co-solvent.

The surfactant system includes an ethoxylated fatty acid non-ionic surfactant having 9 moles of ethylene oxide, n-alkyl dimethyl benzyl ammonium chloride cationic surfactant, where the n-alkyl group is 50% $C_{14}$, 40% $C_{12}$ and 10% $C_{16}$, and a solvent system containing d-limonene as a solvent and isopropanol as a co-solvent. The composition was found to have a flash point of 79° F.

| wt. % | Ingredient |
|---|---|
| 40 | DI Water |
| | Surfactant System |
| 15 | ethoxylated fatty acid |
| 15 | n-alkyl dimethyl benzyl ammonium chloride |
| | Solvent System |
| 15 | isopropanol |
| 15 | d-Limonene |

The surfactant system was added to the solvent system with stirring in an appropriate vessel and mixed until homogeneous. The resulting mixture was then added to the water with stirring sufficient to form a microemulsion.

SPECIFIC EXAMPLES

Example FBA-N

This example illustrates the preparation of a microemulsion of this disclosure, which includes a non-ionic surfactant system and a solvent system containing a blend of dimethyl esters of diacids or dimethyl dibasic esters and a glycol ether co-solvent.

FBA-N contains a linear alcohol ethoxylate non-ionic surfactant, a tridecyl alcohol ethoxylate non-ionic surfactant, a glycol ether co-solvent, and DME, a blend of dimethyl ester solvents. The composition was found to have a flash point greater than 200° F.

| wt. % | Ingredient |
|---|---|
| 68.0 | DI Water |
| | Surfactant System |
| 10.0 | linear alcohol ethoxylate |
| 3.0 | tridecyl alcohol ethoxylate |
| | Solvent System |
| 14.0 | glycol ether |
| 5.0 | DME |

The surfactant system was added to the solvent system with stirring in an appropriate vessel and mixed until homogeneous. The resulting mixture was then added to the water with stirring sufficient to form a microemulsion.

Example FBA-C1

This example illustrates the preparation of a microemulsion of this disclosure, which includes a surfactant system containing a non-ionic surfactant and a cationic surfactant and a solvent system containing a blend of dimethyl esters of diacids or dimethyl dibasic esters solvent and a glycol ether co-solvent.

FBA-C1 contains an ethoxylated fatty acid non-ionic surfactant having 9 moles of ethylene oxide, n-alkyl dimethyl benzyl ammonium chloride cationic surfactant, where the n-alkyl group is 50% $C_{14}$, 40% $C_{12}$ and 10% $C_{16}$, a hydrophilic glycol ether, and DME, a blend of dimethyl esters solvents. The composition was found to have a flash point greater than 200° F.

| wt. % | Ingredient |
|---|---|
| 40 | DI Water |
| | Surfactant System |
| 15 | ethoxylated fatty acid |
| 15 | n-alkyl dimethyl benzyl ammonium chloride |
| | Solvent System |
| 15 | hydrophilic glycol ether |
| 15 | DME |

The surfactant system was added to the solvent system with stirring in an appropriate vessel and mixed until homogeneous. The resulting mixture was then added to the water with stirring sufficient to form a microemulsion.

Example FBA-C2

This example illustrates the preparation of a microemulsion of this disclosure, which includes a cationic surfactant system and a solvent system containing a blend of dimethyl esters of diacids or dimethyl dibasic esters and a glycol ether co-solvent.

FBA-C2 contains an ethoxylated fatty acid non-ionic surfactant, n-alkyl dimethyl benzyl ammonium chloride cationic surfactant, where the n-alkyl group is 50% $C_{14}$, 40% $C_{12}$ and 10% $C_{16}$, a glycol ether co-solvent, and DME, a blend of dimethyl dibasic ester solvents. The composition was found to have a flash point greater than 200° F.

| wt. % | Ingredient |
|---|---|
| 46.0 | DI Water |
| | Surfactant System |
| 14.0 | ethoxylated fatty acid |
| 14.0 | n-alkyl dimethyl benzyl ammonium chloride |
| | Solvent System |
| 13.0 | glycol ether |
| 13.0 | DME |

The surfactant system was added to the solvent system with stirring in an appropriate vessel and mixed until homogeneous. The resulting mixture was then added to the water with stirring sufficient to form a microemulsion.

Example FBA-A

This example illustrates the preparation of a winterized microemulsion composition of this disclosure, which includes a surfactant system containing a non-ionic surfactant and an anionic surfactant, a solvent system containing a blend of dimethyl esters of diacids or dimethyl dibasic esters and a glycol ether co-solvent, and a winterizing system.

FBA-A contains an isopropyl amine salt of linear dodecylbenzene sulfonic acid anionic surfactant, a linear alcohol ethoxylate non-ionic surfactant, a glycol ether co-solvent, DME, a blend of dimethyl esters solvents, and propylene glycol. The composition was found to have a flash point greater than 200° F.

| wt. % | Ingredient |
|---|---|
| 59.0 | DI Water |
| | Surfactant System |
| 14.0 | isopropyl amine salt of dodecylbenzene sulfonic acid |
| 2.8 | linear alcohol ethoxylate |
| | Solvent System |
| 8.0 | glycol ether |
| 5.0 | DME |
| | Winterizing System |
| 11.2 | propylene glycol |

The surfactant system was added to the solvent system and the winterized system with stirring in an appropriate vessel and mixed until homogeneous. The resulting mixture was then added to the water with stirring sufficient to form a microemulsion.

TESTING EXAMPLES

Water recovery formulations were evaluated in a glass column in order to measure relative performance with respect to water recovery and oil recovery.

The test column was 1" in diameter and approximately 12" long, and was fitted with a cap on one end with a ½" threaded hole drilled into it. A ball valve with a ¼" barb was screwed into the end cap and the column was filled with 20 grams of test fluid, followed by 40 grams of a mixture of 100 mesh sand and 50/120 mesh shale. The sand was lightly compacted in order to eliminate air pockets in the pack. The excess test fluid was allowed to drain through the sand pack until there was no standing liquid left on the pack. The difference in starting mass and ending mass in the pack was recorded as the pore volume. Three pore volumes were added through the top of the column without disturbing the sand pack, and these were allowed to drain until the liquid level was even with the sand pack, whereupon the pore volume was recalculated. Crude oil was then layered on top of the saturated sand pack to a height of 5 cm above the top of the sand pack. The timer was started when the ball valve was opened, and the water and oil that emerged from the column were collected at specific time intervals and measured in grams as a function of time. During the test, oil was continuously added to the 5 cm line in order to maintain hydrostatic pressure inside the column. At the end of 2 hours, the masses of water and oil that were collected were divided by the pore volume to get percent recovery. Because oil is continually added to the column during the test, the recovery may be greater than 100%. For the following tests, a 2 wt. % solution of potassium chloride in deionized water was used as the base fluid for comparing the new flowback compositions. The crude oil was a light crude oil from the Permian Basin that had a 41° API gravity.

The prior flowback solution was prepared by adding 2 gpt (0.2% v/v) of a prior art microemulsion composition to a 2 wt. % KCl brine. The prior art microemulsion composition included a solvent system consisting of isopropanol and d-limonene and referred to as FBA-Comp. The test results for FBA-Comp were measured, and the FBA-Comp containing solution had a water recovery of 85% and an oil recovery of 63% as shown in FIG. 1. The flash point of FBA-Comp was determined to be 86° F. using a Grabner Instruments Miniflash FLP closed cup flash point tester.

The non-ionic test formulation FBA-N was prepared as a 2 gpt solution in 2 wt. % KCl and applied to the test column.

Figure 2:
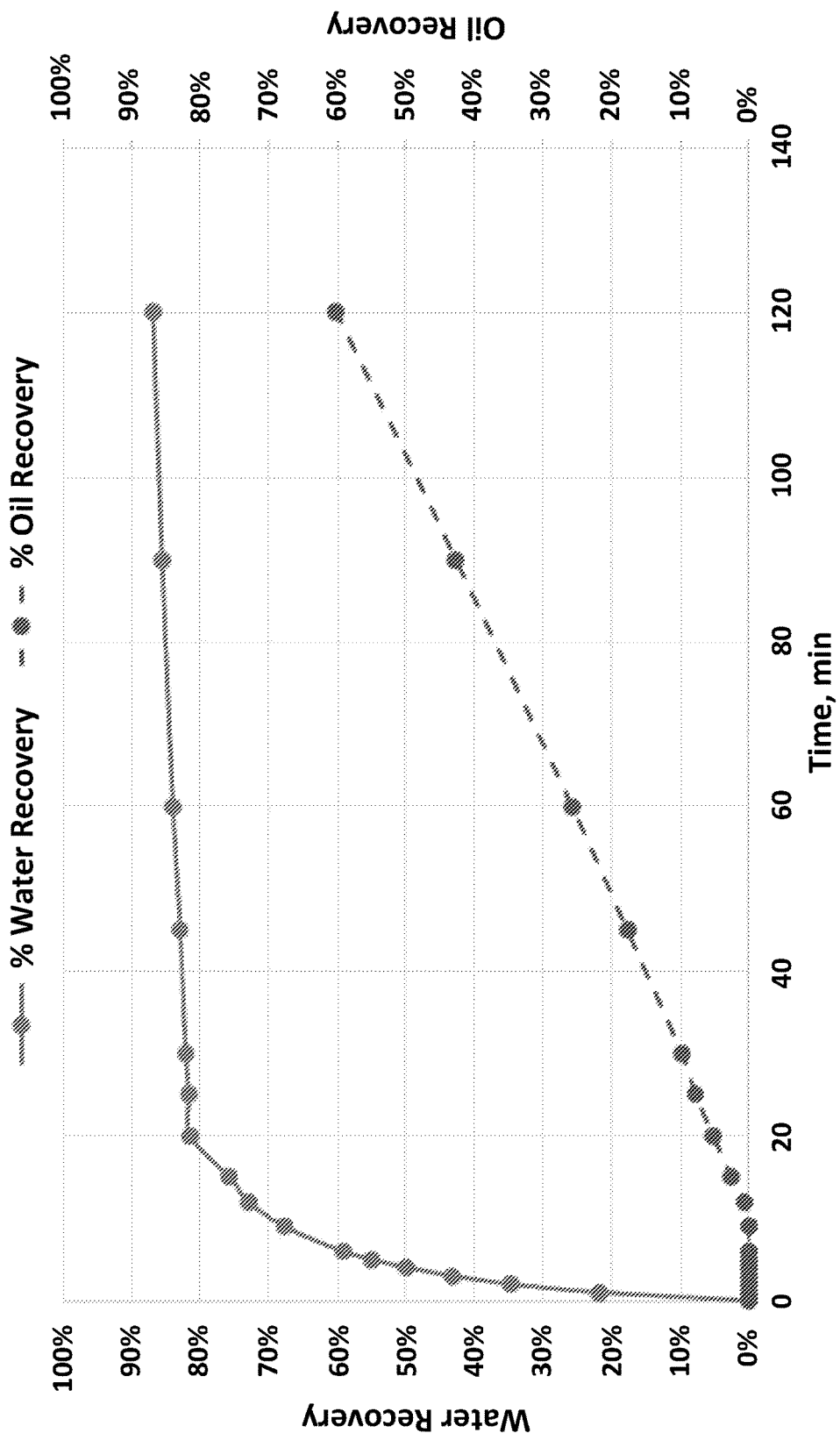
FIG. 2 depicts a plot of % water recovery and % oil recovery vs. time for FBA-N.

The test results for FBA-N were measured, and the FBA-N containing solution led to a water recovery of 87% and an oil recovery of 60% as shown in FIG. 2.

Figure 3:
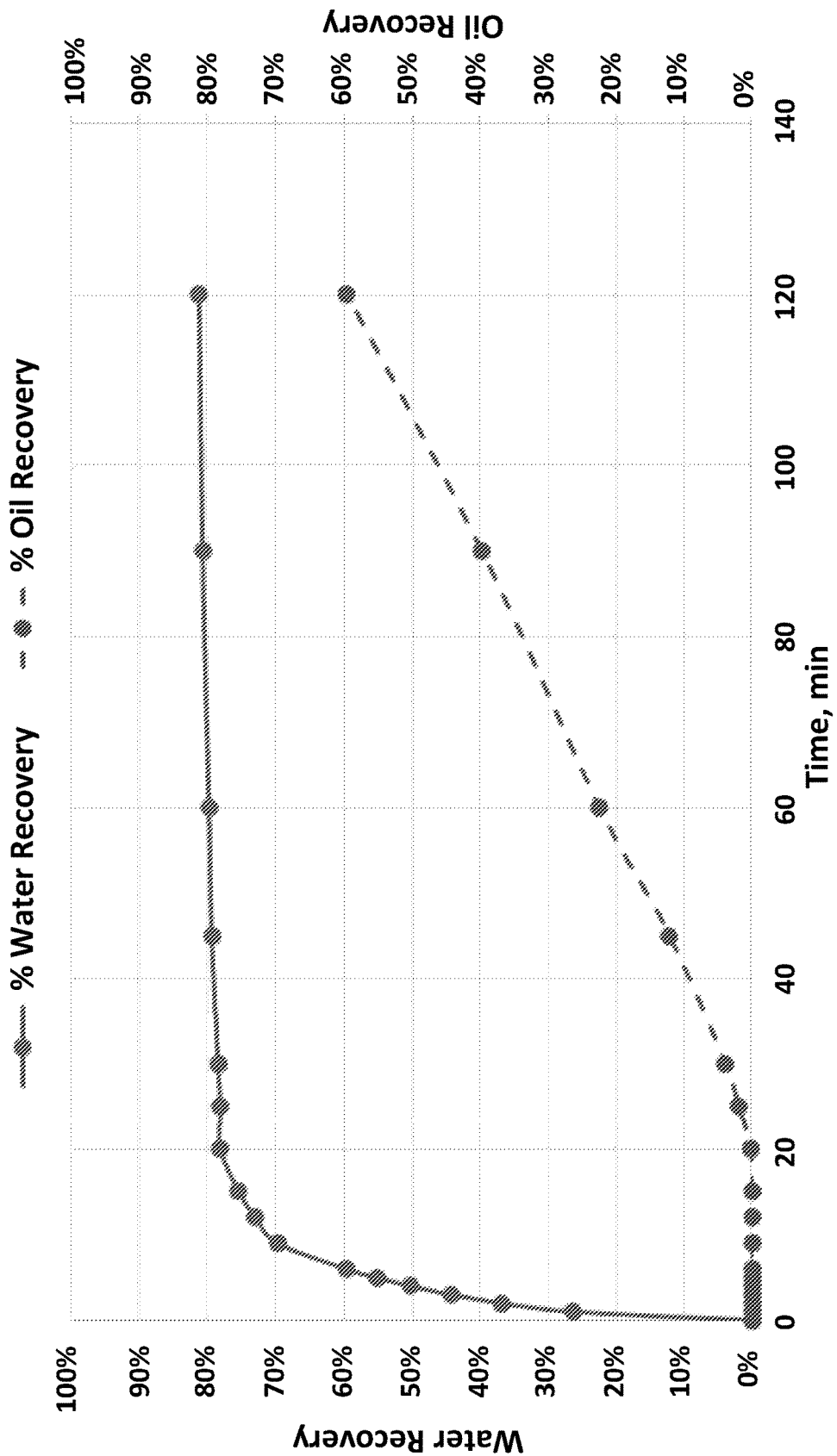
FIG. 3 depicts a plot of % water recovery and % oil recovery vs. time for FBA-C2.

The cationic test formulation FBA-C2 was prepared as a 2 gpt solution in 2% KCl and applied to the test column. The test results for FBA-C2 were measured, and the FBA-C2 containing solution led to a water recovery of 81%, while oil recovery was 60% as shown in FIG. 3.

Figure 4:
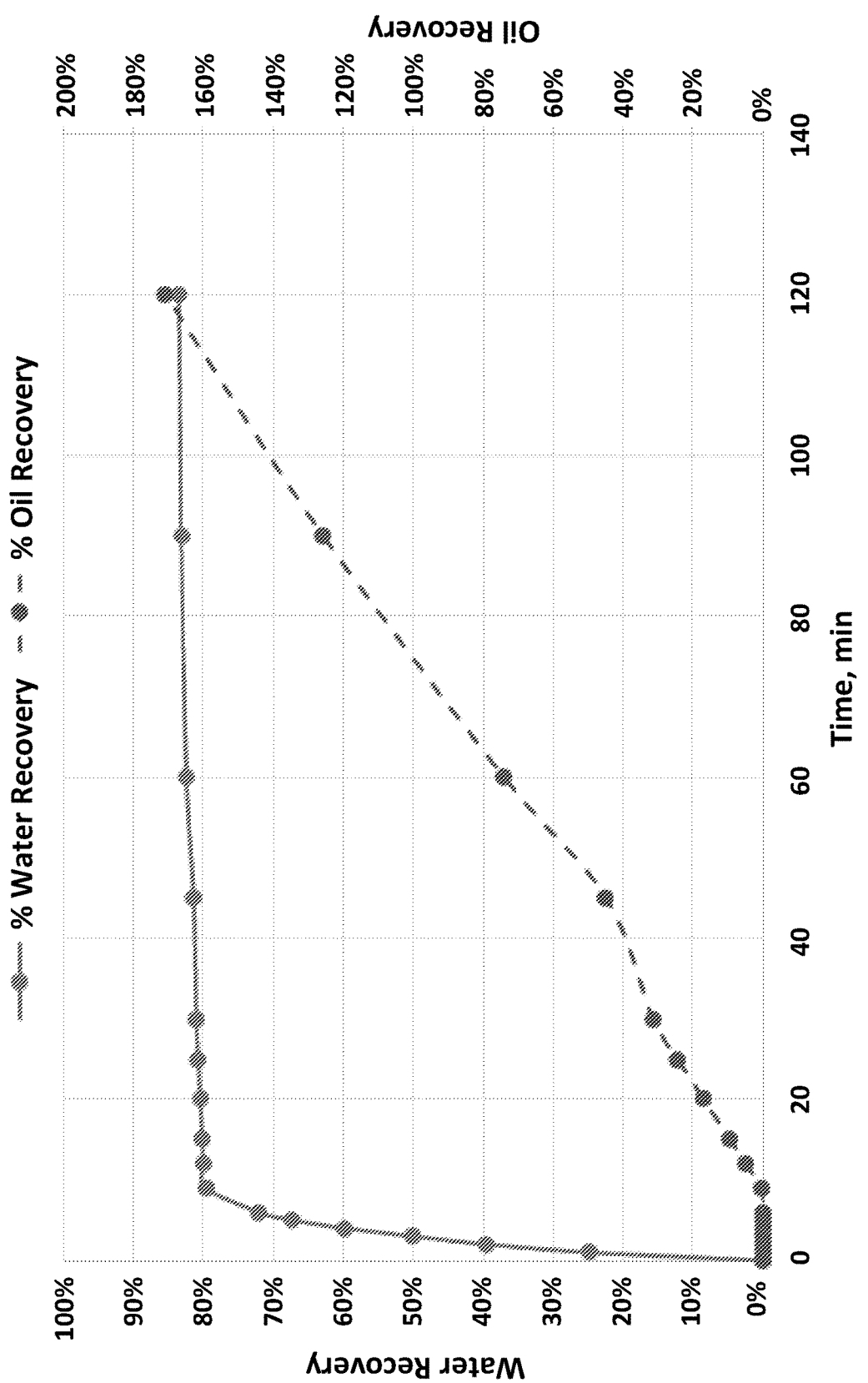
FIG. 4 depicts a plot of % water recovery and % oil recovery vs. time for FBA-A.

The anionic test formulation FBA-A was prepared as a 2 gpt solution in 2% KCl and applied to the test column. The test results for FBA-A were measured, and the FBA-A containing solution led to a water recovery of 85%, while oil recovery was 346% as shown in FIG. 4.

CLOSING PARAGRAPH

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method of treating a hydrocarbon bearing formation comprising:
    injecting, into the formation, a stimulating fluid or hydraulic fracturing fluid including:
        an effective amount of a microemulsion water recovery composition comprising:
            from 40 wt. % to 80 wt. % of an aqueous system,
            from 30 wt. % to 10 wt. % of a solvent system including a dibasic ester or a plurality of dibasic esters, and
            a surfactant system including:
                from 15 wt. % to 5 wt. % of a first non-ionic surfactant or a plurality of first non-ionic surfactants, and
                from 15 wt. % to 5 wt. % of a co-surfactant comprising a second nonionic surfactant, an anionic surfactant, a cationic surfactant, or mixtures thereof,
            wherein the first non-ionic surfactants and the second non-ionic surfactant are different,
            wherein the microemulsion water recovery composition improves water recovery during oil and/or gas well stimulating or hydraulic fracturing when added to a stimulating fluid or fracturing fluid, and
            wherein the effective amount is between about 50 ppm and about 5,000 ppm, and
        is sufficient to reduce an interfacial tension between the stimulation fluid and the hydrocarbons within the formation being treated and lowering a capillary pressure of the formation and increasing a recovery of injected water.

2. The method of claim 1, wherein the non-ionic surfactants are selected from the group consisting of linear alcohol alkoxylates, branched alcohol alkoxylates, secondary alcohol alkoxylates, tridecyl alcohol alkoxylates, Guerbet alcohol alkoxylates, castor oil alkoxylates, fatty acid alkoxylates, alkylphenol alkoxylates, terpene alkoxylates, sorbitan esters, sorbitan ester alkoxylates, alkyl polyglucosides, polyoxyethylene glycol alkyl ethers, polyoxypropylene glycol alkyl ethers, polyoxyethylene glycol alkylphenol ethers, glycerol alkyl esters, tall oil fatty acid alkyl esters, amides, disubstituted amides, alkanolamides, alkanolamide alkoxylates, and mixtures thereof.

3. The method of claim 1, wherein the solvent system further includes a co-solvent or a plurality of co-solvents.

4. The method of claim 3, wherein the co-solvents are selected from the group consisting of primary alcohols, glycol ethers, and mixtures thereof.

5. The method of claim 4, wherein:
    the primary alcohols are selected from the group consisting of heptanol, octanol, nonanol, decanol, dodecanol, benzyl alcohol, and mixtures thereof, and
    the glycol ethers are selected from the group consisting of ethylene glycol monomethyl ether, ethylene glycol monoethyl ether, ethylene glycol monopropyl ether, ethylene glycol monoisopropyl ether, ethylene glycol monobutyl ether, ethylene glycol monohexyl ether, ethylene glycol monophenyl ether, ethylene glycol monobenzyl ether, diethylene glycol monomethyl ether, diethylene glycol monoethyl ether, diethylene glycol monomethyl ether, diethylene glycol monobutyl ether, diethylene glycol monohexyl ether, triethylene glycol monomethyl ether, triethylene glycol monoethyl ether, triethylene glycol monobutyl ether, propylene glycol methyl ether, dipropylene glycol methyl ether, tripropylene glycol methyl ether, propylene glycol n-propyl ether, dipropylene glycol n-propyl ether, dipropylene glycol n-butyl ether, propylene glycol n-butyl ether, tripropylene glycol n-butyl ether and mixtures thereof.

6. The method of claim 1, wherein the surfactant system further includes a co-surfactant or a plurality of co-surfactants.

7. The method of claim 6, wherein the co-surfactants are selected from the group consisting of non-ionic surfactants, cationic surfactants, anionic surfactants, and mixtures thereof.

8. The method of claim 7, wherein:
    the non-ionic surfactants are selected from the group consisting of linear alcohol alkoxylates, branched alcohol alkoxylates, secondary alcohol alkoxylates, tridecyl alcohol alkoxylates, Guerbet alcohol alkoxylates, castor oil alkoxylates, fatty acid alkoxylates, alkylphenol alkoxylates, terpene alkoxylates, sorbitan esters, sorbitan ester alkoxylates, alkyl polyglucosides, polyoxyethylene glycol alkyl ethers, polyoxypropylene glycol alkyl ethers, polyoxyethylene glycol alkylphenol ethers, glycerol alkyl esters, tall oil fatty acid alkyl esters, amides, disubstituted amides, alkanolamides, alkanolamide alkoxylates, and mixtures thereof,
    the anionic surfactants are selected from the group consisting of alkylbenzenesulfonates, linear alkylbenzene sulfonates, linear alkylamine salts of alkylbenzenesulfonic acids, branched alkylamine salts of alkylbenzenesulfonic acids, sodium alkylbenzenesulfonates, calcium alkylbenzenesulfonates, magnesium alkylbenzenesulfonates, sodium alkyl sulfates, sodium dialkylsulfosuccinates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, sarcosinates, taurinates, and mixtures thereof, and
    the cationic surfactants are selected from the group consisting of terta-hydrcarbyl ammonium salts, tri-hydrocarbyl, hydrogen ammonium salts, di-hydrocarbyl, dihydrogen ammonium salts, mono-hydrocarbyl, trihydrogen ammonium salts, terta-hydrcarbyl phosphonium salts, tri-hydrocarbyl, hydrogen phosphonium salts, di-hydrocarbyl, dihydrogen phosphonium salts, mono-hydrocarbyl, trihydrogen phosphonium salts, and mixtures thereof, where the salts include a halide ion selected from the group consisting of a fluoride ion, a chloride ion, a bromide ion, or an iodide ion, a hydroxide ion, a phosphate ion, a phosphonate ion, a sulfate ion, a sulfonate ion, a carboxylate ion, or mixtures thereof.

9. The method of claim 1, wherein the dibasic esters comprise linear, branched, and/or cyclic compounds of the following formula:

$$R^1OOC-R-COOR^2$$

wherein:
- $R^1$, and $R^2$ are independently hydrocarbyl groups having between 1 and 20 carbon atoms, and
- R is a linking group having between 1 and 30 carbon atoms,
- one or more of the hydrogen atoms may be replaced by halogen atoms, alkoxy groups, amide groups, and/or relatively inert groups and one or more of the carbon atoms may be replace by an oxygen atom or a sulfur atom,
- the hydrocarbyl groups are alkyl groups, aryl groups, aralkyl groups, alkaryl groups, heterocyclic groups, or mixtures and combinations thereof,
- the alkyl groups or moieties are saturated or unsaturated, linear, branched, and/or cyclic, the linking groups are hydrocarbenyl groups, and
- the hydrocarbenyl groups are alkenyl, arenyl, aralkenyl, alkarenyl, heterocyclic, or mixtures and combinations thereof.

10. The method of claim 9, wherein the dibasic esters comprise compounds of the following formulas:

$$R^1OOC\text{-alkenyl-}COOR^2$$

$$R^1OOC\text{-aralkenyl-}COOR^2$$

$$R^1OOC\text{-alkarenyl-}COOR^2$$

$$R^1OOC\text{-heterocyclic-}COOR^2$$

wherein:
- $R^1$, and $R^2$ are independently hydrocarbyl groups having between 1 and 20 carbon atoms, and
- R is a linking group having between 1 and 30 carbon atoms,
- one or more of the hydrogen atoms may be replaced by halogen atoms, alkoxy groups, amide groups, and/or relatively inert groups and one or more of the carbon atoms may be replace by an oxygen atom or a sulfur atom,
- the hydrocarbyl groups are alkyl groups, aryl groups, aralkyl groups, alkaryl groups, heterocyclic groups, or mixtures and combinations thereof,
- the alkyl groups or moieties are saturated or unsaturated, linear, branched, and/or cyclic, the linking groups are hydrocarbenyl groups, and
- the hydrocarbenyl groups are alkenyl, arenyl, aralkenyl, alkarenyl, heterocyclic, or mixtures and combinations thereof.

11. The method of claim 9, wherein the dibasic esters comprise compounds of the following formulas:

$$R^1OOC-(CH_2)_q-COOR^2$$

$$R^1OOC-(CR^3R^4)_q-COOR^2$$

$$R^1OOC-(CR^3R^4)_r-(CH_2)_{q2}-COOR^2$$

$$R^1OOC-(CH_2)_{q1}-(CR^3R^4)_r-COOR^2$$

$$R^1OOC-(CH_2)_{q3}-(CR^3R^4)_r-(CH_2)_{q4}-COOR^2$$

wherein:
- $R^1$, and $R^2$ are independently hydrocarbyl groups having between 1 and 20 carbon atoms, and
- R is a linking group having between 1 and 30 carbon atoms,
- $R^3$ and $R^4$ are independently a hydrogen atom or a hydrocarbyl group having between 1 and 20 carbon atoms or may form a cyclic group,
- one or more of the hydrogen atoms may be replaced by halogen atoms, alkoxy groups, amide groups, and/or relatively inert groups and one or more of the carbon atoms may be replace by an oxygen atom or a sulfur atom, and
- q is an integer having a value between 1 and 10,
- q1 is an integer having a value between 1 and 10,
- q2 is an integer having a value between 1 and 10,
- q3 and q4 are integers having values between 1 and 10, and
- r is an integer having a value between 1 and 10,
- the hydrocarbyl groups are alkyl groups, aryl groups, aralkyl groups, alkaryl groups, heterocyclic groups, or mixtures and combinations thereof,
- the alkyl groups or moieties are saturated or unsaturated, linear, branched, and/or cyclic, the linking groups are hydrocarbenyl groups, and
- the hydrocarbenyl groups are alkenyl, arenyl, aralkenyl, alkarenyl, heterocyclic, or mixtures and combinations thereof.

12. The method of claim 11, wherein the dibasic esters are selected from the group consisting of dialkyl succinate, dialkyl ethylsuccinate, dialkyl glutarate, dialkyl methylglutarate, dialkyl adipate, and mixtures thereof.

13. The method of claim 1, further comprising a winterizing system comprising a glycol or a plurality of glycols.

14. The method of claim 13, wherein the glycols are selected from the group consisting of ethylene glycol, diethylene glycol, triethylene glycol, propylene glycol, dipropylene glycol, tripropylene glycol, butanediol, and mixtures thereof.

15. The method of claim 1, wherein the composition has a flash point greater than 140° F. or greater than 200° F.

16. The method of claim 1, wherein the microemulsion water recovery composition comprises:
- between about 80 wt. % and about 40 wt. % of the aqueous system,
- between about 10 wt. % and about 30 wt. % of the solvent system, and
- between about 10 wt. % and about 30 wt. % of the surfactant system.

17. The method of claim 16, wherein:
the surfactant system comprises:
- between about 50 wt. % and 100 wt. % of one or more surfactants, and
- between about 50 wt. % and 0 wt. % of one or more co-surfactants, and the solvent system comprises:
- between about 50 wt. % and 100 wt. % of one or more solvents, and
- between about 50 wt. % and 0 wt. % of one or more co-solvents.

18. The method of claim 1, wherein the microemulsion water recovery composition comprises:
- between about 70 wt. % and about 40 wt. % of the aqueous system, between about 15 wt. % and about 30 of the solvent system, and between about 15 wt. % and about 30 wt. % of the surfactant system.

19. The method of claim 18, wherein:

the surfactant system comprises:

between about 50 wt. % and 100 wt. % of one or more surfactants, and between about 50 wt. % and 0 wt. % of one or more co-surfactants, and the solvent system comprises:

between about 50 wt. % and 100 wt. % of one or more solvents, and between about 50 wt. % and 0 wt. % of one or more co-solvents.

20. The method of claim 1, wherein the microemulsion water recovery composition comprises:

between about 60 wt. % and about 40 wt. % of the aqueous system, between about 20 wt. % and about 30 wt. % of the solvent system, and between about 20 wt. % and about 30 wt. % of the surfactant system.

21. The method of claim 20, wherein:

the surfactant system comprises:

between about 50 wt. % and 100 wt. % of one or more surfactants, and between about 50 wt. % and 0 wt. % of one or more co-surfactants, and the solvent system comprises:

between about 50 wt. % and 100 wt. % of one or more solvents, and between about 50 wt. % and 0 wt. % of one or more co-solvents.

\* \* \* \* \*